Sept. 28, 1971                L. H. LEONARD, JR                3,608,331
ABSORPTION REFRIGERATION SYSTEM
Filed March 18, 1970                                   2 Sheets-Sheet 1

INVENTOR.
LOUIS H. LEONARD, JR.
BY Frank N. Decker Jr.
ATTORNEY

Sept. 28, 1971     L. H. LEONARD, JR     3,608,331

ABSORPTION REFRIGERATION SYSTEM

Filed March 18, 1970     2 Sheets-Sheet 2

INVENTOR
LOUIS H. LEONARD, JR

BY Frank N. Decker Jr.

ATTORNEY

United States Patent Office 3,608,331
Patented Sept. 28, 1971

3,608,331
ABSORPTION REFRIGERATION SYSTEM
Louis H. Leonard, Jr., De Witt, N.Y., assignor to
Carrier Corporation, Syracuse, N.Y.
Filed Mar. 18, 1970, Ser. No. 20,776
Int. Cl. F25b 15/06
U.S. Cl. 62—476                                              7 Claims

ABSTRACT OF THE DISCLOSURE

An absorption refrigeration system wherein there is provided in communication with the absorber and generator, fluid conditioning apparatus in the form of a hermetic housing supporting therein a plurality of rotatable flash chambers, one of which receives relatively cool weak absorbent solution from the absorber, and another of the chambers having directed thereto relatively hot strong absorbent solution from the generator, the two solutions being centrifugally impelled outwardly so as to transfer the solutions through the apparatus by means of scoop pumps, the strong solution being successively flash cooled and the resulting flash vapors absorbed by the weak solution, whereby the weak solution is heated, diluted, and transferred to the generator and strong solution is concentrated, cooled, and transferred to the absorber.

BACKGROUND OF THE INVENTION

Absorption refrigeration systems employing multi-stage flash heat exchangers have been previously proposed. Such systems, however, frequently suffer the disadvantage of requiring substantial excess height to permit gravity drainage from one stage to another stage at a different pressure and to balance the pressure differences between stages with liquid seal loops. Accordingly, it has been necessary to utilize multiple pumps to and between the various stages of the flash heat exchanger in an absorption refrigeration system using such an arrangement in order to conserve height. However, the use of conventional pumps renders such a system prohibitively expensive for most practical applications. In addition, crystallization of absorbent solution in prior flash heat exchanger embodiments have presented a problem because it is difficult to desolidify a flash-type heat exchanger where there are no heat transfer tubes through which heat can be applied.

Accordingly, it is a principal feature of this invention to provide a rotary, multiple stage flash heat exchange apparatus which avoids the necessity of conventional pumps between stages and which overcomes the problems previously encountered with solidification of flash heat exchangers.

SUMMARY OF THE INVENTION

In accordance with this invention, there is provided an absorption refrigeration machine which embodies therein fluid conditioning apparatus in the form of a hermetic housing communicating with the absorber and generator. Supported within the housing is a plurality of flash chambers, which are rotatively driven by suitable means. One rotating flash chamber stage receives relatively hot strong absorbent solution from the generator and returns by a scoop pump relatively warm weak solution to the generator, while another of the flash chamber stages receives weak solution from the absorber and returns cooled strong solution to the absorber by another scoop pump. The relatively hot strong solution directed into the one flash chamber from the generator is flash cooled therein and the resulting flash vapors are absorbed by counterflowing weak solution to provide, by reason of the pressure difference between the chambers, successive stages of flash cooling and heat transfer between the oppositely moving strong and weak solutions. If desired, rotating eliminators may be utilized in each flash chamber for the purpose of exposing the maximum amount of solution to the flashing action and also reducing the size of the droplets produced. Further, all flash chambers are preferably rotatively driven by a single motor, and there may be provided an arrangement for intermixing of weak solution with strong solution upon machine shutdown to prevent solution solidification within the heat exchanger.

DESCRIPTION OF THE PREFERRED EMBODIMENT

In accordance with a preferred embodiment of this invention, there is provided an absorption refrigeration system which utilizes water as a refrigerant and an aqueous solution of lithium bromide as an absorbent. A suitable compound, such as octyl alcohol (2-ethyl-n-hexanol), may be added to the solution for heat transfer promotion, and suitable corrosion inhibitors may also be used. "Strong solution" as referred to herein is a concentrated solution of lithium bromide which is strong in absorbing power, and "weak solution" is a dilute solution of lithium bromide which is weak in absorbing power. "Intermediate solution" refers to solution intermediate in absorbing power.

Figure 1:
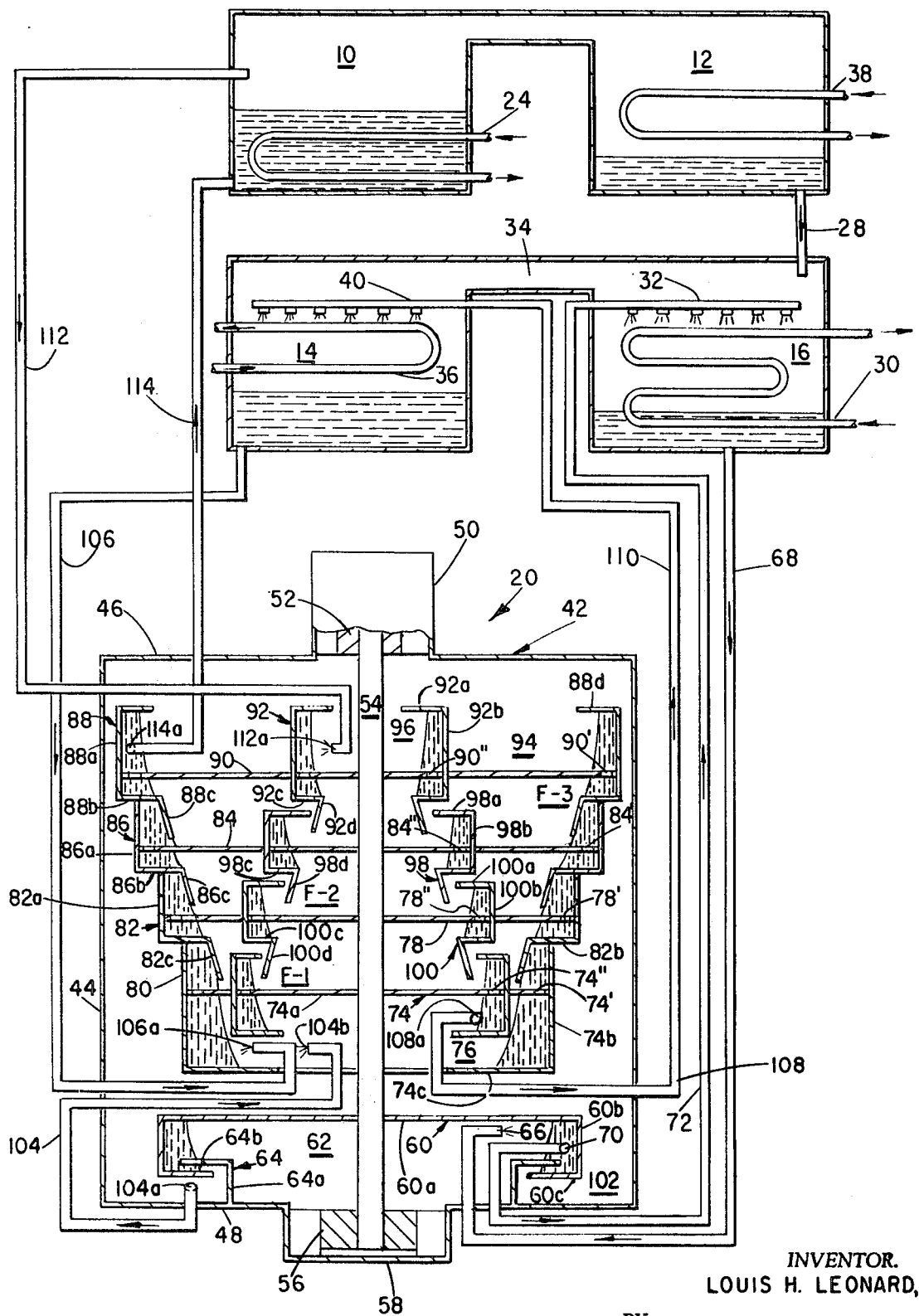
FIG. 1 is a schematic flow diagram, partially in cross section, of an absorption refrigeration system embodying an exemplary form of fluid conditioning apparatus for accomplishing the purposes of this invention.

Referring now first to FIG. 1 of the drawings, there is shown an absorption refrigeration system comprising a generator 10, a refrigerant condenser 12, an absorber 14, an evaporator 16, and fluid conditioning apparatus 20, the components named being in communication to provide refrigeration. Generator 10 comprises a boiler in which weak absorbent solution is directed through conduit means 112, the solution being caused to boil in the generator by action of a heat source such as steam coil 24 to concentrate the absorbent solution by vaporizing refrigerant therefrom. Other types of generators employing a combustible gas may be utilized instead of the arrangement shown.

Water vapor boiled off from the weak solution in generator 10 passes to condenser 12 where it is condensed. The water is passed through conduit 28 to evaporator 16. A heat exchanger 30 is located in the evaporator through which a fluid to be cooled is passed. Spray header 32 is disposed in the evaporator to wet the surface of the coil 30 with liquid refrigerant in a manner to be later described.

Absorbent solution in absorber 14 absorbs some of the water vapor formed in evaporator 16, thereby chilling the fluid in coil 30 which is in heat exchange therewith. The water vapor passes through passage 34 connecting the evaporator and absorber. Heat exchangers 36 and 38 connected to condensing water are located in the absorber 14 and condenser 12, respectively, to remove waste heat from the refrigeration cycle. Also located in the absorber 14 is spray header 40 which serves to wet the surfaces of heat exchanger 36 with absorbent solution.

The fluid conditioning apparatus shown in FIG. 1 preferably comprises a substantially cylindrical housing 42 having a main body portion 44 which connects with top and bottom walls 46 and 48. Wall 46 includes a dome section 50 which contains therein bearing means 52 and motor means (not shown) for imparting a rotative driving force to main drive shaft 54, journalled at its opposite end in bearing means 56 seated in a cavity defined by embossment 58 formed in the housing bottom wall 48. The bearings 52 and 56 are desirably formed of a suitable graphitic material.

Supported by the drive shaft 54 adjacent its lower end is an inverted trough or pan 60 shaped to include a roof portion 60a from which depends an annular side wall portion 60b integral with a radially inwardly directed flange portion 60c. The inverted trough 60 defines what may be termed an evaporator circulation chamber 62. This chamber is isolated from the remainder of the housing by a pressurized hydrodynamic seal formed by flange 60c and an annular seal member 64 formed with an upstanding leg portion 64a connected to the bottom wall 48 of the housing and integral with a radially outwardly directed arm portion 64b.

Leading into the chamber 62 is an inlet nozzle 66 which communicates with evaporator 16 through conduit means 68 to pass liquid refrigerant to chamber 62. Refrigerant is picked up by scoop 70 and transferred through conduit 72 where it is sprayed over heat exchanger 30.

Carried by the rotatable drive shaft 54 and located next above the trough 60 is a second inverted pan or trough 74 which defines therewithin an absorber circulation chamber 76. The trough 74 is shaped to include a roof portion 74a from which depends an annular side wall portion 74b integral with a radially inwardly extending flange portion 74c. Located in staged relation above the absorber circulation chamber are a plurality of flash chamber stages generally designated by the legends F-1, F-2, and F-3, three being shown although any number of chambers can be provided.

The flash chambers are structurally interconnected as shown, the first stage chamber F-1 being defined along its bottom by roof portion 74a of trough 74 and along its top by partition member 78. Flash chamber F-1 includes upstanding annular side wall portion 80 which is a vertical extension of trough side wall 74b and connected to the upper end of the side wall 80 is a shaped side wall member 82 formed to include an annular outer side wall portion 82a integral with a radially extending wall portion 82b from which depends a sloping or slanted wall portion 82c.

Chamber F-2 is defined along its lower portion by the first partition member 78, along its top by a second partition member 84, and in part along its sides by annular side wall portion 82a of the side wall member 82. Connected to the side wall portion 82a is a further side wall member 86 of a configuration essentially identical to the member 82 and, accordingly, like legends 86a, 86b, and 86c have been applied thereto. Flash chamber F-3 is defined in a similar manner, the numeral 88 having been applied to the annular side wall member, and the portions thereof being designated as 88a, 88b, and 88c. Forming the top of chamber F-3 is a partition member 90.

The annular side wall member 88 includes at the upper end of the side wall portion 88a a radially inwardly directed top flange portion 88d, which in combination with partition member 90 and annular trough member 92 located generally centrally of the housing 42 adjacent the top wall thereof define a pair of generator circulation chambers 94 and 96. The annular trough member 92 is supported for rotation upon main shaft 54 by means of partition 90 and is shaped to include a top flange portion 92a from which depends an annular side wall portion 92b connected to a radially inwardly disposed flange portion 92c integral with a radially outwardly sloping wall portion 92d. Radially and vertically spaced from the uppermost trough member 92 is a second annular trough member 98 which is of essentially the same configuration as the trough 92 and, accordingly, the numerals 98a–d have been applied to like wall portions. Similarly, annular trough member 100 next below the trough 98 is of like shape, and the numerals 100a–d designate the wall portions thereof.

Each of the partition members 74, 78, 84, and 90 is provided with two sets of openings 74′, 74″, 78′, 78″, 84′, 84″, 90′, and 90″, the openings in each set preferably being arranged in circumferentially spaced relation and having as one function to provide drain passages for solution upon machine shutdown. The solution which flows downwardly from the chambers 76, F-1, F-2, F-3, 94, and 96 when rotation of the shaft 54 is terminated, mixes with refrigerant from chamber 62 in collection chamber 102 at the bottom of the housing 42 to dilute the solution and avoid solidification. When machine operation is then resumed, the solution-refrigerant mixture is transferred from the chamber 102 by scoop pump 104 having an eduction orifice 104a and discharge nozzle 104b into flash chamber F-1. As is shown, scoop pump 104 is stationarily mounted by the housing 42, and rotation of pan 60 spins the liquid in chamber 102 causing it to be pumped through scoop pump 104 into chamber 76.

Discharging relatively weak absorbent solution from absorber 14 into absorbent circulation chamber 76 through conduit means 106 is discharge nozzle means 106a, while also disposed stationarily with respect to the rotatable chambers within the housing 42 is scoop pump 108 having an eduction orifice 108a serving to transfer relatively cool strong solution through conduit means 110 to spray header 40 located in absorber 14. Also in accordance with this invention, the fluid conditioning apparatus 20 incorporates in communication with generator circulation chamber 96 conduit means 112 terminating at one end in discharge orifice 112a and leading to generator 10 from which relatively hot solution resulting from the boiling action which takes place therein is transferred. Conduit means 114 having a scoop pump orifice 114a passes warm weak solution from generator circulation chamber 94 to generator 10.

Relatively weak cool absorbent solution drains from the absorber 14 through the conduit 106 and is discharged through orifice 106a into absorber circulation chamber 76. In operation, shaft 54 and pan members 74, 82, 86, 88 are rotated. Solution from the absorber is centrifugally impelled outwardly in the chamber 76 and successively passes radially outwardly through successively increasing diameter flash chambers and upwardly along the sloping wall surfaces, and passes through the equalizing passages 74′, 78′, 84′, and 90′. The weak solution thereby passes through successive flash chambers in heat exchange relationship with strong hot solution passing from the generator 10 downwardly through the flash chambers. Hot solution from the generator is discharged into the chamber 96 and is centrifugally impelled outwardly in this chamber. The strong solution successively flows radially outwardly and downwardly through successively increasing diameter flash chambers and through equalizing openings 90″, 84″, 78″, and 74″. The strong solution is flash cooled as it moves through the flash chambers F-3, F-2, and F-1 due to the hot strong solution being exposed to cooler weak solution therein. The water vapor which results from the flashing actions in the flash chambers is transferred to the surfaces 82c, 86c, and 88c by passing between members 100, 74; 98, 100; and 92, 98 to thereby warm the relatively weak solution which is centrifugally being forced upwardly in the manner earlier described. Flashing of refrigerant from the strong solution cools and concentrates the strong solution, while absorption of the refrigerant vapor in the weak solution further dilutes the weak solution and imparts heat thereto.

Simultaneously, solution in the collection chamber 102 at the bottom of the housing 42 is pumped by scoop pump 104 and discharged into absorber chamber 76 to mix with the strong solution flowing downwardly through the flash chambers. The mixed solution in absorber circulation chamber 76 is picked up by eduction orifice 108a of scoop pump 108 and transferred through conduit 110 into the absorber 14 through spray header 40. Thus, by the heat exchange action which takes place in the fluid conditioning apparatus 20, the concentrated solution directed to the absorber through the conduit 110 is relatively cool and more concentrated, while the relatively weak solution picked up by the scoop pump 114a from generator circulation chamber 94 is relatively warm and more dilute. The load imposed on generator 10 is thereby reduced.

While the relatively weak and relatively strong absorbent solutions are counterflowing, refrigerant from the evaporator 16 moves through conduit 68 and is discharged through nozzle 66 into evaporator circulation chamber 62 which is hydrodynamically sealed from the rest of the housing 42 by means of the seal device 64 and the cooperating flange portion 60c on the rotating inverted pan 60. The refrigerant is returned to the evaporator 16 by scoop pump 70 through conduit 72. The refrigeration cycle is thus completed.

Figure 2:
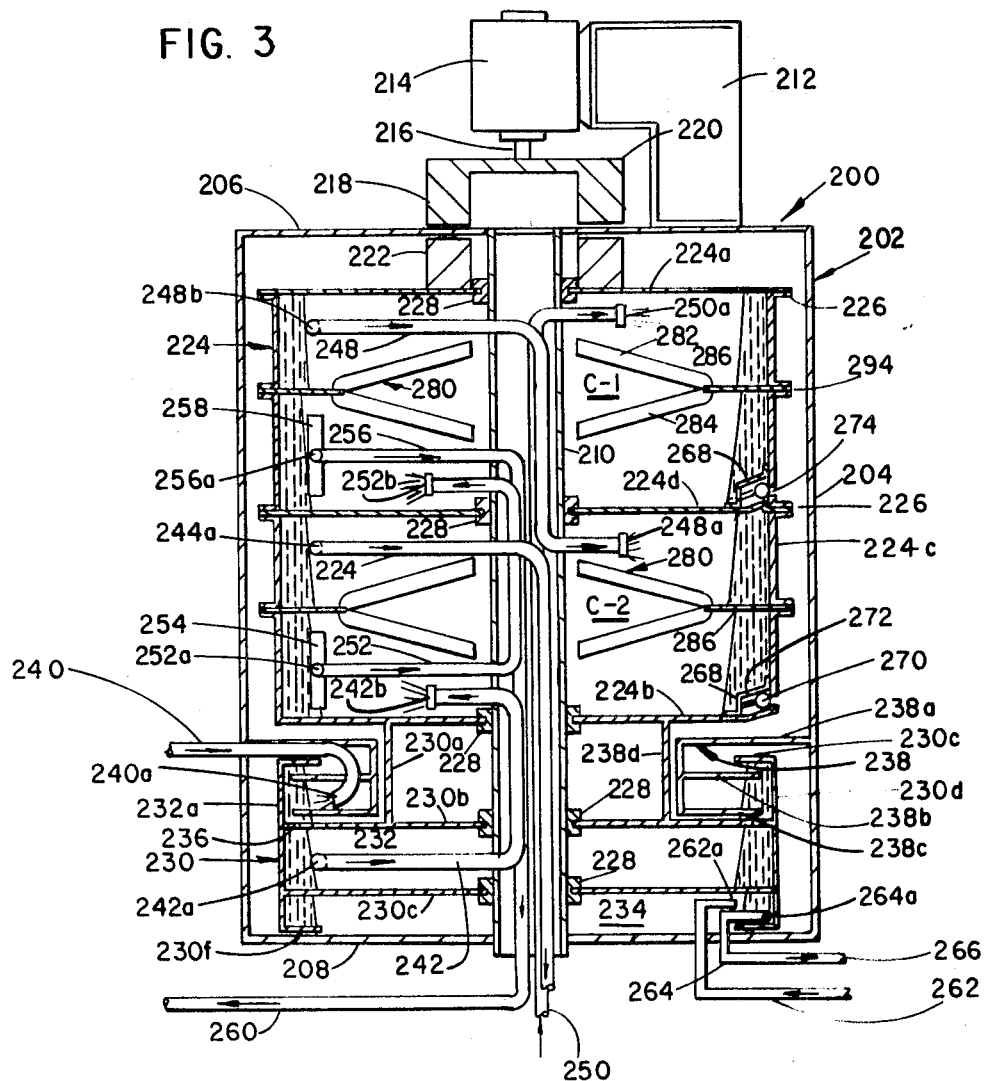
FIG. 2 is an elevational view, taken partially in section, showing another form of fluid conditioning apparatus incorporating the instant invention.

Another embodiment of the present invention utilizing a plurality of staged or stacked flash chambers is shown in FIG. 2, to which reference is now made. Fluid conditioning apparatus, designated in its entirety by the numeral 200 and which is in communication with the other components of the absorption refrigeration machine in the manner of FIG. 1, comprises a hermetic housing 202 having a generally cylindrical main body portion 204 integral with top and bottom walls 206 and 208. Supported by the housing 202 in coaxially spaced relation to the body portion 204 thereof is a stationary hollow shaft 210, which may be secured by welding or like techniques to the housing top and bottom walls or may be formed as an integral part of the housing. The top wall 206 of the housing is connected to fixed structure 212 which provides support for motor means 214 having a stub shaft 216 which is attached to coupling member 218 of magnetic drive means 220 effective upon rotation to apply a magnetically induced force to matching coupling member 222 secured to top wall portion 224a of inner rotatable housing 224.

Housing 224 defines a plurality of flash chambers C-1 and C-2, although more chambers may be provided if desired. The rotatable inner housing 224 further includes a bottom wall portion 224b, a generally cylindrical side wall portion 224c and an intermediate partition member 224d, the side wall being connected to the top wall and partition by flange means 226 if desired. Located in contacting relation with the stationary central shaft 210 and with the top wall, partition member and bottom wall of the inner housing are annular bearing means 228 which may be solution lubricated and of graphitic composition, and which also function as pressure seals between the flash chambers C-1 and C-2 to isolate these chambers from pressure conditions interiorly of the stationary outer hermetic housing 202.

Also connected to bottom wall 224b of rotatable inner housing 224 is depending annular wall portion 230a of rotatable trough or pan 230 defining by the configuration shown an absorber circulation chamber 232, and an evaporator circulation chamber 234 isolated therefrom. Wall structure further defining the chambers 232 and 234 is a pair of vertically spaced partition members 230b and 230c associated with bearing and sealing means 228, the partition 230b having a plurality of circumferentially spaced openings 236 therein which provide passages for flow of solution from absorber circulation sub-chamber 232a to chamber 232. Connecting the partition members 230b and 230c at their ends opposite from the bearing means 228 is upstanding wall portion 230d of trough 230 and from this wall extends radially inwardly directed flange portion 230f.

The absorber circulation chamber 232 and evaporator circulation chamber 234 are isolated from the flash chambers C-1 and C-2 by hydrodynamic seal means 238 having a plurality of vertically spaced wall portions 238a, 238b, and 238c connected by upstanding annular wall 238d. The upper wall of the seal means 238 may be welded or otherwise secured to the stationary hermetic housing 202, and in cooperation with the rotatable trough 230, the means 238 seals off the relatively low pressure zone in the lower region of the housing from the higher pressure zone existing thereabove.

Disposed in absorber circulation sub-chamber 232a is feed conduit 240 having a discharge nozzle 240a through which flows relatively weak absorbent solution draining from absorber 14. Solution discharged into sub-chamber 232a is centrifugally impelled outwardly and drains through openings 236 into absorber circulation chamber 232 where it is picked up by a scoop pump 242 having an eduction orifice 242a and a discharge spray nozzle 242b in flash chamber C-2. Also in chamber C-2 is a scoop pump 244 provided with an eduction orifice 244a communicating with conduit means 246 passing relatively cool solution to absorber 14 through spray header 40.

Chamber C-2 also has located therein spray nozzle 248a of scoop pump 248 having its eduction orifice 248b in flash chamber C-1 to pick up relatively hot strong solution fed to this chamber through spray nozzle 250a of conduit 250 leading from the generator. Further, in flash chamber C-2 is scoop pump 252 which includes an education orifice 252a and a solution distributor head 254 which may take the form of a relatively thin flat plate, the distributor being provided for the purpose of skimming a small amount of solution from the rotating liquid and spraying it around in the rotating flash chamber C-2. The scoop pump 252 discharges solution from chamber C-2 to chamber C-1 through spray nozzle 252b, and in this chamber the solution is centrifugally impelled outwardly and picked up through eduction orifice 256a of scoop pump 256 which also has a solution agitator head 258 associated therewith. Solution scooped up by the pump 256, and which is relatively weak and warm, passes through conduit 260 to generator 10 to be reconcentrated therein.

Located within the evaporator circulation chamber 234 is a liquid refrigerant discharge nozzle 262a forming a part of conduit 262 leading from evaporator 16, and a scoop pump 264 having an eduction orifice 264a communicating with conduit 266 leading to evaporator 16. Since the action which takes place within the chamber 234 is essentially identical to that which occurs in the evaporator circulation chamber 62 of FIG. 1, further description is believed to be unnecessary.

Each of the flash chambers C-1 and C-2 further incorporates means to permit drainage and intermixing of strong and weak solution upon machine shutdown, as well as rotative eliminator means which perform the dual function of centrifuging out any droplets which are liberated when flash cooling of absorbent solution occurs in the chambers C-1 and C-2 and forming flashing and absorbing surfaces when wetted with solution. Valve means effective to permit drainage of solution when rotation of the flash chambers is terminated may take many forms, and an illustrative structure as shown in FIG. 2 may include a casing 268 welded or otherwise secured to bottom wall 224b, partition 224d, and annular side walls 224c of the inner rotatable housing 224 defining in part the flash chambers C-1 and C-2, the bottom wall and partition being shaped upwardly in their radial outmost portions to provide a track for rotatable elements 270 guided by races 272 and effective during rotation of the flash chambers to close passages 274 in the lower portion of the flash chamber side walls by reason of the rotatable elements being centrifugally impelled thereagainst.

Figure 3:
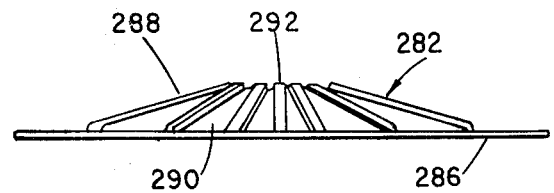
FIG. 3 is a plan view of a rotating eliminator of the type illustrated in FIG. 2.

The rotative eliminator and redistribution means may also take various forms, and a presently preferred arrangement is shown in detail in FIG. 3 to be viewed also in conjunction with FIG. 2. The eliminators in the chambers C-1 and C-2 are of essentially identical configuration and, accordingly, the numeral 280 has been employed to designate each in its entirety. Each eliminator comprises upper and lower sections 282 and 284, which may be termed strong solution and weak solution surfaces; and again each is formed in an essentially identical manner. Referring particularly to FIG. 3, the top eliminator 282 comprises a relatively flat base portion 286 from which is struck a plurality of circumferentially spaced and radially inwardly directed sloping rib or blade members 288 which define therebetween a plurality of circumferentially spaced slotted openings 290 communicating with a generally centrally located aperture 292 in the base portion 286. By flange means or the like 294, the eliminators are secured to the inner housing side walls.

Upon application of a rotative driving force to inner housing 224 by motor means 214 acting through magnetic coupling means 220, weak absorbent solution draining through conduit 240 from absorber 14 into absorber circulation sub-chamber 232a is centrifugally impelled outwardly and drains through openings 236 into absorber circulation chamber 232 from which it is scooped by pump 242 and transferred into flash chamber C-2. Essentially simultaneously relatively warm strong solution is pumped from generator 10 through conduit 250 and discharged into flash chamber C-1.

At the same time, strong solution from chamber C-1 is flash cooled therein and the flash vapors resulting act upon the weak solution in this same chamber in heat transfer relationship therewith, the weak solution having been transferred by scoop pump 252 and discharged into this chamber through the nozzle 252b. In each flash chamber the vanes 288 on the rotating eliminators 282 swirl the centrifugally impelled liquid, breaking down any relatively large droplets into smaller sized droplets, and by reason of the surfaces presented by the eliminators 282, essentially all of the solution in each flash chamber is placed in good heat transfer relation. Droplets produced by the flash cooling in large measure will strike the vanes 288 on the eliminator members and be returned to their respective chambers. The eliminators also act as flashing and absorbing surfaces for refrigerant vapor when wetted with solution. Weak solution in flash chamber C-1, which has now been somewhat elevated in temperature, is scooped by pump 256 through conduit 260 to the generator 10. The distributor head 258 associated with the pumps 252 and 256 function to skim the surface of the rotating liquid, thereby effectively creating a flashing liquid surface. The strong solution which has been flash cooled in chamber C-2 is picked up by scoop 244 and transferred through conduit 246 to absorber 14 through spray header 40. The strong solution, which entered the chamber C-1 from the generator and which was at a relatively high temperature at this time, has as a result of the flash cooling action and heat transfer of the flash vapors to the weak solution is, when being transferred to the absorber through the conduit 246 in a relatively lower temperature and higher concentration condition. Likewise, weak solution pumped to the generator through conduit 260 is warmer and weaker than when it entered the solution conditioning apparatus 200 from the absorber through conduit 240. Flanges 238b, 238c, 230c form a liquid seal to prevent vapor from passing between chambers 232, 234, and the flash chambers.

Refrigerant, at the same time, enters the evaporator circulation chamber 234 through conduit 262 and is returned to the evaporator through conduit 266 of which scoop pump 264 is a part.

Upon machine shutdown, the rotatable elements 270 which close the openings 274 during rotation of the inner housing 224 move along the races 272 when rotation of the inner housing 224 is terminated, thereby exposing the openings 274 to permit drainage and intermixing of weak and strong solutions in chamber 232 and 232a, thereby avoiding solution solidification. Flange 238a is above the level of the liquid mixture so that it does not drain into chamber 234. On starting up again, the mixed solution is scooped out of the apparatus by scoop 242 and eventually returned to the generator.

It is believed manifest from the foregoing that by provision of a plurality of rotatable flash chambers to which both weak and strong solutions are directed, effective heat exchange takes place between the counterflowing solutions in a compact apparatus of small vertical height. Also, the need for conventional pumps is eliminated by the rotatable flash heat exchanger of this invention. Likewise, solution solidification is avoided by this invention and only a single motor is required for rotatively driving the flash chamber housing to provide all liquid pumping functions.

Various changes and modifications may be effected in the fluid conditioning apparatus of this invention without departing from the scope of the subjoined claims.

I claim:

1. An absorption refrigeration system comprising a generator for concentrating absorbent solution by vaporizing refrigerant therefrom to form strong absorbent solution; a condenser connected for condensing refrigerant vapor formed in said generator; an evaporator for evaporating the refrigerant liquid; an absorber connected to the evaporator for absorbing refrigerant vapor formed therein; and fluid conditioning apparatus communicating with said generator and absorber, said apparatus including a hermetic housing, at least a pair of pan members within said housing, means for introducing into one of said pan members relatively weak absorbent solution from said absorber, means for introducing into the other of said pan members relatively strong absorbent solution from said generator, vapor passage means for passing vapor from said other pan member to said one pan member to place the relatively strong solution and relatively weak solution in heat transfer relationship, whereby the strong solution is flash cooled and the temperature thereof reduced and the vapors resulting from the flashing action are absorbed by the weak solution to increase the temperature thereof, a scoop member extending into said one pan member for transferring the weak solution to said generator, means for transferring the relatively strong solution to said absorber, and means for rotating at least said one pan member to effect transfer of the weak solution to the generator through said scoop member.

2. An absorption refrigeration system as defined in claim 1, in which the transfer means for relatively strong solution is a scoop member extending into said other pan member, and in which the means for rotating said one pan member also rotates said other pan member.

3. An absorption refrigeration system as defined in claim 1, in which a plurality of pairs of said pan members are provided in vertically stacked relation, and in which the strong and weak solutions move in counterflowing heat transfer relation through said apparatus by rotation thereof.

4. An absorption refrigeration system as defined in claim 3, in which the strong and weak solution pan members are axially spaced from one another, and strong solution from the generator is introduced into the uppermost pan member and weak solution into the lowermost pan member, and in which the pan members are rotated to move the strong and weak solutions axially through said apparatus in counterflow relation to each other.

5. An absorption refrigeration system as defined in claim 1, in which there is provided an absorber circulation chamber in which a plurality of scoop pump members transfer relative weak solution from said absorber circulation chamber to a first rotatable flash chamber and from said first flash chamber to a second rotatable flash chamber, in which a scoop pump member transfers relatively strong solution from said second flash chamber to said first flash chamber, and also in which a scoop pump member transfers relatively strong solution from said first flash chamber to the absorber.

6. An absorption refrigeration system as defined in claim 1 including a plurality of axially spaced pairs of concentric pan members, said pan members being provided with obliquely aligned radially outwardly sloping fluid moving surfaces, perforate partition means between pairs of pan members, the weak solution being centrifugally impelled upwardly through the perforations in the partition means and along the radially outwardly sloping surfaces of said one pan members while simultaneously relatively strong solution moves downwardly through the perforations in the partition means and along the radially outwardly sloping surfaces of said other pan members in heat transfer relationship with the counterflowing weak solution.

7. An absorption refrigeration system as defined in claim 1, in which there is provided in each pan member rotating eliminator means for effecting distribution of solution being centrifugally impelled therewithin.

References Cited

UNITED STATES PATENTS

| | | | |
|---|---|---|---|
| 2,124,914 | 7/1938 | Fottinger | 415—89 |
| 2,184,992 | 12/1939 | Coons | 415—89X |
| 3,124,938 | 3/1964 | Leonard, Jr. | 62—476X |
| 3,389,574 | 6/1968 | McGrath | 62—476X |

WILLIAM F. O'DEA, Primary Examiner

P. D. FERGUSON, Assistant Examiner

U.S. Cl. X.R.

62—489; 415—88, 89